United States Patent
Carlestam et al.

(10) Patent No.: US 11,535,909 B2
(45) Date of Patent: Dec. 27, 2022

(54) METHOD FOR MANUFACTURING A STEEL SHEET PRODUCT

(71) Applicant: SSAB TECHNOLOGY AB, Stockholm (SE)

(72) Inventors: Anders Carlestam, Oxelösund (SE); Oskar Thorstensson, Oxelösund (SE); Hans Eidelöf, Oxelösund (SE); Jonas Thunell, Oxelösund (SE); Jimmy Knutsson, Oxelösund (SE)

(73) Assignee: SSAB TECHNOLOGY AB, Stockholm (SE)

( * ) Notice: Subject to any disclaimer, the term of this patent is extended or adjusted under 35 U.S.C. 154(b) by 0 days.

(21) Appl. No.: 17/624,798

(22) PCT Filed: Jul. 2, 2020

(86) PCT No.: PCT/EP2020/068715
§ 371 (c)(1),
(2) Date: Jan. 4, 2022

(87) PCT Pub. No.: WO2021/004900
PCT Pub. Date: Jan. 14, 2021

(65) Prior Publication Data
US 2022/0259690 A1    Aug. 18, 2022

(30) Foreign Application Priority Data
Jul. 9, 2019  (EP) ..................................... 19185119

(51) Int. Cl.
*C21D 9/46*    (2006.01)
*C22C 38/54*    (2006.01)
(Continued)

(52) U.S. Cl.
CPC .............. *C21D 9/46* (2013.01); *B23K 26/123* (2013.01); *B23K 26/24* (2013.01); *B23K 26/60* (2015.10);
(Continued)

(58) Field of Classification Search
None
See application file for complete search history.

(56) References Cited

U.S. PATENT DOCUMENTS 9,616,513 B2    4/2017  Garcia et al.
9,862,058 B2    1/2018  Breuer et al.
(Continued)

FOREIGN PATENT DOCUMENTS

CN    103003022 A    3/2013
CN    106029292 A    10/2016
(Continued)

OTHER PUBLICATIONS

Intention to Grant European patent to European Application No. 19185119.5-1016 issued by the European Patent Office dated Feb. 2, 2022. "A Method for Manufacturing a Steel Sheet Product" (Applicant—SSAB Technology AB).
(Continued)

*Primary Examiner* — Anthony M Liang
(74) *Attorney, Agent, or Firm* — Ballard Spahr LLP

(57) ABSTRACT

A steel sheet product and a method for manufacturing the steel sheet product are described, the method includes the steps:
  providing at least two steel sheets extending in a longitudinal direction (A),
  cleaning longitudinal edges of the steel sheets by removing any surface oxide layers therefrom,
  joining the steel sheets along the cleaned longitudinal edges using butt welding without filler material to form
(Continued)

a weld, wherein inert gas protection is applied on both a top side and a root side of the weld during welding, thereby obtaining a welded steel sheet product, removal of excess material from the weld, and hardening of the welded steel sheet product by means of heat treatment and subsequent quenching.

10 Claims, 2 Drawing Sheets

(51) Int. Cl.

| | | |
|---|---|---|
| *C22C 38/44* | (2006.01) | |
| *C22C 38/04* | (2006.01) | |
| *C22C 38/02* | (2006.01) | |
| *C22C 38/00* | (2006.01) | |
| *C21D 8/02* | (2006.01) | |
| *C21D 6/00* | (2006.01) | |
| *B23K 26/24* | (2014.01) | |
| *B23K 26/12* | (2014.01) | |
| *B23K 26/60* | (2014.01) | |
| *B23K 101/18* | (2006.01) | |
| *B23K 103/04* | (2006.01) | |

(52) U.S. Cl.
CPC ............ *C21D 6/004* (2013.01); *C21D 6/005* (2013.01); *C21D 6/008* (2013.01); *C21D 8/0205* (2013.01); *C22C 38/002* (2013.01); *C22C 38/02* (2013.01); *C22C 38/04* (2013.01); *C22C 38/44* (2013.01); *C22C 38/54* (2013.01); *B23K 2101/18* (2018.08); *B23K 2103/04* (2018.08)

(56) References Cited

U.S. PATENT DOCUMENTS

| | | |
|---|---|---|
| 11,220,723 B2 | 1/2022 | Dechassey et al. |
| 2013/0236239 A1 | 9/2013 | Brandt et al. |
| 2018/0223403 A1 | 8/2018 | Evertz et al. |

FOREIGN PATENT DOCUMENTS

| | | | |
|---|---|---|---|
| CN | 109226941 A | 1/2019 | |
| EP | 1331058 A1 * | 7/2003 | ........... B23K 1/0056 |
| EP | 1331058 A1 | 7/2003 | |
| EP | 2647730 | 10/2013 | |
| JP | 2000-000612 A | 1/2000 | |
| JP | 2016-531753 A | 10/2016 | |
| JP | 2020-127947 A | 8/2020 | |
| RU | 2323265 | 1/2008 | |
| RU | 2456368 | 7/2012 | |
| RU | 2586953 | 1/2015 | |
| RU | 2691446 | 6/2019 | |
| WO | WO 2012/072884 | 6/2012 | |
| WO | WO 2015/086781 A | 6/2015 | |
| WO | WO 2017/163115 | 9/2017 | |
| WO | WO 2021/004900 A1 | 1/2021 | |

OTHER PUBLICATIONS

International Search Report and Written Opinion dated Oct. 13, 2020 by the International Searching Authority for International Application No. PCT/EP2020/068715 filed on Jul. 2, 2020 and published as WO 2021/004900A1 (Applicant—SSAB Technology AB) (11 pages).

* cited by examiner

METHOD FOR MANUFACTURING A STEEL SHEET PRODUCT

CROSS-REFERENCE TO RELATED APPLICATIONS

This application is a U.S. National Phase Application of International Application No. PCT/EP2020/068715, filed Jul. 2, 2020, which claims priority to European Application No. 19185119.5, filed Jul. 9, 2019, each of which are hereby incorporated by reference in their entirety.

TECHNICAL FIELD

The present invention relates to a method for manufacturing a steel sheet product and to a steel sheet product.

BACKGROUND OF THE INVENTION

High strength steel sheets are commonly used in e.g. the production of containers and tipper bodies of heavy duty vehicles. The high strength makes it possible to reduce the overall weight of the part by reducing its thickness and is therefore beneficial from an energy efficiency point of view. Apart from a high strength, steel sheet products for use in such products need to have good formability and high surface quality. Moreover, for many products, such as for containers and flatbeds for trucks, it is beneficial to provide steel sheet products that combine a large width with a small thickness. Widths of more than 2500 mm may be requested for certain applications, and sometimes in combination with thicknesses of less than 5 mm.

The production of such wide and thin products is however challenging. Wide steel sheets for use in the automotive industry, and for containers and flatbeds of trucks, are today typically produced using Steckel rolling mills or heavy plate rolling mills, in which the plates are fed back and forth between pairs of rolls. The processes for producing thin sheets in such rolling mills are relatively costly since the production rate decreases significantly with reduced sheet thickness. Furthermore, the surface quality as well as the thickness tolerances of the produced steel sheet products are generally inferior due to the slow rolling process. Therefore, there is an ongoing strive for improving the production methods as well as the quality of the produced steel sheet products.

SUMMARY OF THE INVENTION

It is a primary objective of the present invention to provide an in at least some aspect improved method for manufacturing a steel sheet product. In particular, it is an objective to provide such a method which facilitates production of wide steel sheet products, which are difficult to produce in common steel rolling mills. Another objective is to provide a wide steel sheet product which may be used as an alternative to products produced using heavy plate rolling mills. Yet another objective is to provide such a wide steel sheet product with an improved surface quality and thickness uniformity.

At least the primary objective is, according to a first aspect of the invention, achieved by means of the method for manufacturing a steel sheet product defined in claim 1. The method comprises:

providing at least two steel sheets extending in a longitudinal direction, cleaning longitudinal edges of the steel sheets by removing any surface oxide layers therefrom, joining the steel sheets along the cleaned longitudinal edges using butt welding without filler material to form a weld, wherein inert gas protection is applied on both a top side and a root side of the weld during welding, thereby obtaining a welded steel sheet product, removal of excess material from the weld, hardening of the welded steel sheet product by means of heat treatment and subsequent quenching.

According to a second aspect of the invention, at least one of the above defined objectives is achieved by means of a steel sheet product manufactured using the proposed method.

The proposed method enables cost efficient production of thin and wide steel sheet products having high surface quality, good bendability and high strength. The proposed steel sheet products may replace thin and wide steel sheet products produced using plate rolling mills and generally have improved thickness tolerances and better surface quality with lower surface roughness in comparison with such products. By joining more than two steel sheets, very wide steel sheet products having high surface quality and good bendability are possible to produce. Since the welding is performed prior to hardening, the welding operation has negligible influence on the final microstructure of the steel sheet product.

Thanks to the use of inert gas protection on both the top side and the root side of the weld, and not only on the top side which is common practice, the weld is well protected from oxygen during welding and the formation of grain boundary ferrite in the area of the weld is thereby inhibited. The weld may thereby obtain a martensitic or a substantially martensitic microstructure after quenching, ensuring a high strength and a good bendability.

The removal of surface oxides from the longitudinal edges, in an area where welding is to be performed, also ensures that the finished steel sheet product obtains a homogeneous microstructure with no differences between the weld and other areas of the product. The surface oxides may comprise a mill scale comprising $Fe_3O_4$, and/or rust comprising $Fe_2O_3$. Furthermore, the welding without filler material is necessary in order to maintain the chemical composition of the steel sheets across the weld.

The steel sheets may according to the proposed method be produced using strip rolling instead of heavy plate rolling. In comparison with heavy plate rolling, including also the use of Steckel rolling mills, the strip rolling process is much faster and the strip is only passed once between each pair of rolls. The production rate may thereby be significantly increased. At the same time, the formation of mill scale during the rolling process is impeded thanks to the higher rolling speed. Compared to a heavy plate rolling mill, the rolls are also smaller and the thickness tolerances may thereby be improved.

According to one embodiment of the first aspect of the invention, the steel sheets are low alloyed high strength steel sheets. Such steel sheets obtain a martensitic microstructure after quenching, or a microstructure including at least 80% of martensite in terms of area percentages, preferably at least 90%. A tensile strength $R_m$ of the steel sheets after quenching may be at least 950 MPa, preferably at least 1100 MPa, more preferably at least 1350 MPa, and a yield strength $R_{p0.2}$ may be at least 850 MPa, preferably at least 900 MPa, more preferably at least 1000 MP. Low alloyed high strength steels are suitable for production of products for use in e.g.

heavy duty vehicles, since they exhibit a higher strength-to-weight ratio than carbon steel.

According to one embodiment of the first aspect of the invention, the steel sheets are non-coated steel sheets, i.e. steel sheets that have not been provided with any surface coating such as a metal pre-coating. Intermetallic areas around the weld, arising as a result of welding and subsequent alloying, may thereby be avoided such that a strong weld is ensured. If desired, a metal coating can be applied to the steel sheet product subsequent to quenching.

According to one embodiment, the steel sheets have an identical or substantially identical chemical composition. By "substantially identical" chemical compositions are herein intended chemical compositions that are identical within manufacturing tolerances. After welding, the steel sheet product will thus have a uniform composition. Since the welding is without filler material, the weld will also have the same, or substantially the same, chemical composition as the rest of the steel sheet product.

According to one embodiment, the steel sheets have a chemical composition comprising, in percent by weight (wt. %):
C: 0.050-0.32,
Si: 0.10-0.70,
Mn: 0.40-1.6,
P: 0-0.025,
S: 0-0.010,
Cr: 0-1.5,
Ni: 0-2.5,
Mo: 0-0.70,
Ti: 0-0.060,
Al: 0-0.15,
V: 0-0.070,
Nb: 0-0.20,
B: 0.00020-0.0050,
balance Fe and impurities.

The resulting steel sheet product has the same chemical composition as the steel sheets, also across the weld thanks to the absence of filler material during welding, the removal of surface oxides prior to welding and the use of inert gas protection of both sides of the weld.

According to one embodiment, the steel sheets have a chemical composition comprising, in percent by weight (wt. %):
C: 0.050-0.26,
Si: 0.10-0.70,
Mn: 0.40-1.6,
P: 0-0.025,
S: 0-0.010,
Cr: 0-1.4,
Ni: 0-1.5,
Mo: 0-0.60,
Ti: 0.0010-0.050,
Al: 0.010-0.15,
B: 0.00020-0.0050,
balance Fe and impurities.

Thereby, an abrasion-resistant steel sheet product with excellent structural properties, good bendability and weldability may be obtained.

In another embodiment, the steel sheets have a chemical composition comprising, in percent by weight (wt. %):
C: 0.050-0.21,
Si: 0.10-0.50,
Mn: 0.40-1.2,
P: 0-0.010,
S: 0-0.003,
Cr: 0.2-1.0,
Ni: 1.2-2.5,
Mo: 0.40-0.70,
V: 0.0010-0.070,
Nb: 0.0050-0.050,
Al: 0.020-0.10,
B: 0.00020-0.0050,
balance Fe and impurities.

Thereby, a combination of high hardness and high toughness may be achieved.

In another embodiment, the steel sheets have a chemical composition comprising, in percent by weight (wt. %):
C: 0.050-0.30,
Si: 0.10-0.70,
Mn: 0.40-1.6,
P: 0-0.020,
S: 0-0.010,
Cr: 0.2-1.5,
Ni: 0.20-1.5,
Mo: 0-0.60,
Al: 0.010-0.10,
Nb: 0.020-0.20
B: 0.00020-0.0050,
balance Fe and impurities.

Thereby, a combination of high tensile strength, hardness and toughness may be achieved.

In another embodiment, the steel sheets have a chemical composition comprising, in percent by weight (wt. %):
C: 0.050-0.32,
Si: 0.10-0.40,
Mn: 0.40-1.2,
P: 0-0.010,
S: 0-0.003,
Cr: 0.20-1.0,
Ni: 0.50-1.8,
Mo: 0.10-0.70,
V: 0.010-0.070,
Al: 0.020-0.15,
B: 0.00020-0.0050,
balance Fe and impurities.

Thereby, a very high toughness may be achieved.

According to one embodiment, the butt welding is carried out using a laser welding process. By using a laser welding process, it is possible to achieve a high production rate at a relatively low cost. Alternatives to laser welding are plasma welding, tungsten inert gas (TIG) welding, electron beam welding. However, laser welding is preferable from productivity and cost efficiency points of view.

According to one embodiment, the quenching is water quenching or oil quenching. This type of quenching provides fast cooling and thereby improves the ability to obtain desirable mechanical properties also with a relatively small amount of alloying elements.

According to one embodiment, the removal of any surface oxide layers is carried out using at least one of, or any one of, pickling, grinding, and laser ablation. Grinding provides a cost efficient way of removing surface oxides, but pickling and/or laser ablation, preferably using a pulsed laser, may also be used. When the surface oxide layers comprise mill scale, grinding and/or pickling is/are preferably used for removal of the mill scale, although it is also, or instead, possible to use a pulsed laser having a relatively short pulse duration, such as a pulse duration within the nanosecond time range, or within the picosecond time range, or shorter.

According to one embodiment, the at least two steel sheets have an identical or substantially identical (within manufacturing tolerances) thickness of 1-6 mm. For example, the thickness may be 2-5 mm, or 3-5 mm, or 2-4 mm, or 3-4 mm. The resulting steel sheet product may thus have a thickness of 1-6 mm, such as 2-5 mm, or 3-5 mm, or 2-4 mm, or 3-4 mm. Each one of the at least two steel sheets may have a width of at least 1000 mm, preferably of at least 1250 mm as measured in a transverse direction, perpendicular to the longitudinal direction. A length-to-width ratio of each steel sheet may by way of example be between 5:1 and 10:1. The resulting steel sheet product may have a width as measured in the transverse direction of at least 2000 mm, preferably of at least 2500 mm. Such wide steel sheet products are useful to produce for example containers and flatbeds for trucks.

According to one embodiment, providing the at least two steel sheets comprises:
 providing at least one steel slab,
 strip rolling of the at least one steel slab to form at least one steel strip, from which at least one steel strip the at least two steel sheets are formed.

By using strip rolling to form strips instead of plate rolling of wider steel sheets, production costs may be significantly reduced. Furthermore, the surface quality and the thickness manufacturing tolerances may be improved thanks to the higher precision and speed of the strip rolling process as compared to heavy plate rolling. For example, a thickness manufacturing tolerance of ±0.4 mm, or ±0.3 mm, or ±0.2 mm, or ±0.1 mm, may be achieved using strip rolling of the at least one steel slab to a steel strip having a thickness within the above mentioned ranges. For a steel strip having a nominal thickness of 3-4 mm and a width of 1200-1500 mm, a thickness manufacturing tolerance of ±0.3 mm, or ±0.2 mm, or ±0.1 mm, may be achieved. The final steel sheet product may have a slightly larger thickness deviation at the weld, but a thickness manufacturing tolerance of ±0.4 mm, or ±0.3 mm, is possible to achieve for the final steel sheet product. The strip rolling process may be either cold rolling or hot rolling, wherein cold rolling is preferably used for very thin sheets having a thickness of about 2 mm or less. The strip rolling process may comprise passing the steel slab/steel strip between consecutively arranged pairs of rolls, wherein the steel slab/steel strip is only passed once between each pair of rolls.

The at least two steel sheets may preferably be formed from the same steel strip which is cut to length to form the steel sheets, but they may also originate from different steel strips produced from different steel slabs.

According to one embodiment, the steel sheet product has a tensile strength $R_m$ across the weld of at least 950 MPa, preferably of at least 1100 MPa, more preferably of at least 1350 MPa, and a yield strength $R_{p0.2}$ across the weld of at least 850 MPa, preferably of at least 900 MPa, more preferably of at least 1000 MPa. The steel sheet product is thereby suitable for use in demanding applications in which it may be subjected to high stresses, such as in automotive applications.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF PREFERRED EMBODIMENTS

Figure 1:
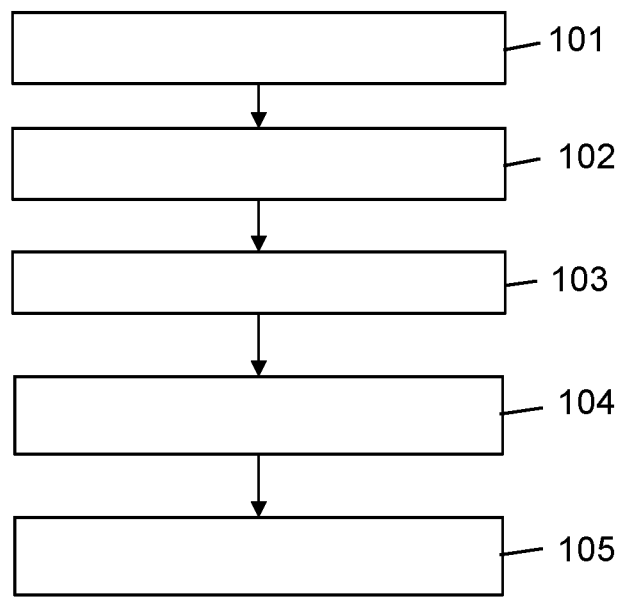
FIG. 1 is a flow chart illustrating a method according to an embodiment of the invention.
Figure 2:
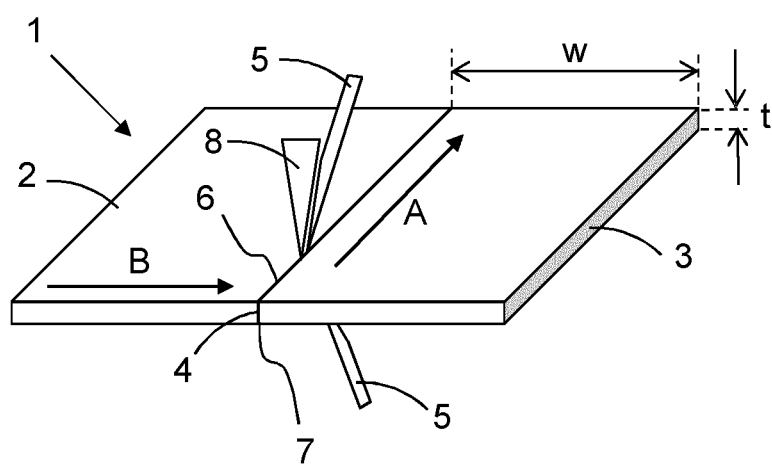
FIG. 2 is a perspective view illustrating welding of a steel sheet product according to an embodiment of the invention.

A method according to an embodiment of the invention is schematically illustrated in FIG. 1. Reference is also made to FIG. 2, schematically illustrating a steel sheet product 1 being manufactured using the method according to an embodiment of the invention.

In a first step 101, at least two steel sheets 2, 3 extending in a longitudinal direction A are provided. The steel sheets 2, 3 are preferably low alloyed high strength steel sheets which are not provided with any surface coating such as a metal coating. A surface oxide layer may however be present on the steel sheets. The steel sheets 2, 3, may e.g. be produced by strip rolling of a steel slab in a hot rolling or a cold rolling process such that a steel strip is formed. The steel sheets 2, 3 are thereafter formed from the rolled steel strip, e.g. by cutting the steel strip to length. The steel sheets 2, 3 may have identical or substantially identical chemical compositions. A width w of each of the steel sheets, as measured in a transverse direction B perpendicular to the longitudinal direction A, may be at least 1000 mm, preferably at least 1250 mm. The steel sheets 2, 3 may not necessarily have the same width. A thickness t of the steel sheets 2, 3 may be 2-6 mm, such as 2-5 or 3-5 mm. A length-to-width ratio of the steel sheets 2, 3 may by way of example be between 5:1 and 10:1.

In a second step 102, longitudinal edges of the steel sheets 2, 3 along which the sheets are to be joined, or portions of the steel sheets 2, 3 including those longitudinal edges and surrounding areas, are cleaned by removing any surface oxide layers therefrom. Such surface oxide layers may be iron oxides resulting from the strip rolling process, such as mill scale comprising $Fe_3O_4$ and/or rust comprising $Fe_2O_3$. Removal of the surface oxide layers may e.g. be performed using grinding, laser ablation or pickling.

In a third step 103, the steel sheets 2, 3 are joined along the cleaned longitudinal edges, i.e. in the longitudinal direction A, using butt welding without filler material to form a weld 4 extending in the longitudinal direction A. Inert gas protection 5, such as He or Ar or a mixture of He and Ar, is applied on both a top side 6 and a root side 7 of the weld 4 during welding to eliminate any presence of oxygen. The welded steel sheet product 1 is thereby obtained. The butt welding may preferably be performed by means of a laser beam 8 applied in a laser welding process.

In a fourth step 104, excess material is removed from the weld such as to remove sharp edges and reduce the risk of crack formation. This may be realized using e.g. grinding, laser ablation, milling or planning, or a combination of two or more of those techniques.

In a fifth step 105, the welded steel sheet product 1 is hardened by means of heat treatment, i.e. annealing, and subsequent quenching to form a martensitic or mainly martensitic microstructure. The fifth step 105 is in the shown embodiment carried out after the fourth step 104. Although this order of the steps is preferred, it is also possible to first harden the steel sheet product and thereafter remove excess material. The quenching is preferably water or oil quenching, but the hardening may also be a press hardening process in which the steel sheet product is quenched within a press hardening tool.

EXAMPLES

A number of steel sheets having a thickness t of 3.3 mm, a width w of 1270 mm and a length in the longitudinal direction A of 8900 mm were produced in a strip rolling process to provide a product batch S1. The steel sheets of the product batch S1 were produced from a single steel slab of a steel grade available under the trade name Hardox® 450, having a chemical composition comprising, in percent by weight (wt. %):
C: max 0.26,
Si: max 0.70,
Mn: max 1.6,
P: 0-0.025,
S: 0-0.010,
Cr: max 1.4,
Ni: max 1.5,
Mo: max 0.60,
B: max 0.005,
balance Fe and impurities.

The steel sheets of product batch S1 were used to manufacture steel sheet products of a product batch S2 using the method according to an embodiment of the invention as described above. Laser welding was used to form the weld. Surface oxide layers were removed prior to welding using grinding. Water quenching was used in the hardening process.

The steel sheets of product batch S1 were also used to manufacture reference product batches S3, S4 following the same method steps, but in one case (S3) without using inert gas protection on the root side of the weld during welding, and in one case (S4) without removing surface oxides prior to welding and without using inert gas protection on the root side of the weld during welding. Details regarding the manufactured product batches S1-S4 are summarized in table I below.

TABLE I

| Product batch | Weld formed? | Surface oxides removed prior to welding? | Inert gas used on both top and root sides? |
|---|---|---|---|
| S1 | No | — | — |
| S2 | Yes | Yes | Yes |
| S3 | Yes | Yes | No |
| S4 | Yes | No | No |

Figure 3:
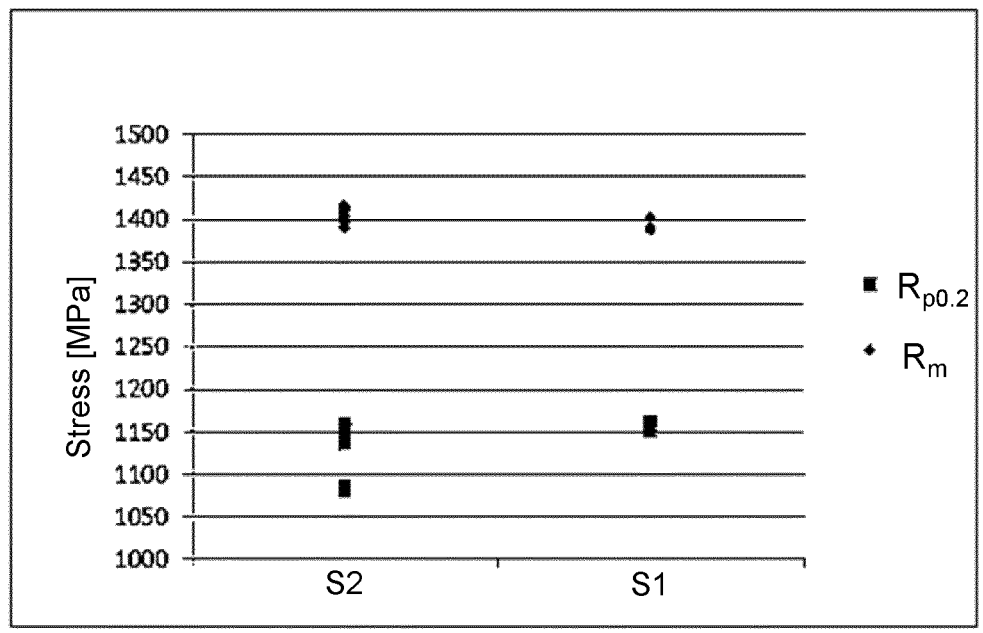
FIG. 3 is a diagram showing results of tensile tests.

Tensile testing was performed according to standard SS-EN ISO 6892-1 2016, using on one hand test samples from the product batch S2 including the weld and on the other hand test samples from the product batch S1, without weld. Results from tensile testing is shown in FIG. 3, wherein the tensile strength $R_m$ and the yield strength $R_{p0.2}$ of the samples from the product batch S1 are shown to the right and the tensile strength $R_m$ and the yield strength $R_{p0.2}$ of the samples from the product batch S2, including the weld, are shown to the left. For all tested samples, the tensile strength $R_m$ was approximately 1400 MPa for samples from both batches S1 and S2. The yield strength $R_{p0.2}$ was around 1150 MPa for the base material from the product batch S1 (no weld) and 1080-1150 MPa for the samples from the product batch S2, including the weld.

Figure 4:
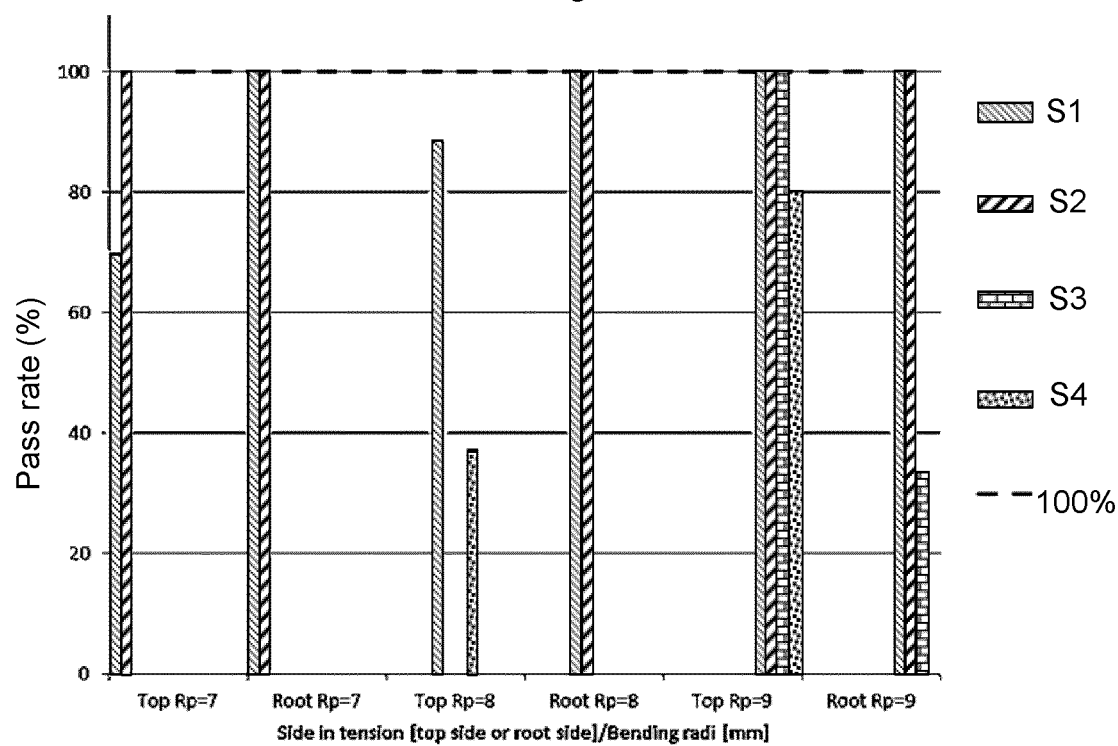
FIG. 4 is a diagram showing results of bending tests,
It is to be noted that all drawings are schematic. Details may thus be omitted and the various features may not be drawn to scale.

Bending tests were performed according to standard SS-EN ISO 7438 2016, using samples from the product batches S1, S2, S3 and S4, with bending radii of 7 mm, 8 mm and 9 mm and with either the top side or the root side being in tension. Results from the bending tests are shown in FIG. 4. It can be seen that samples from the product batch S2, manufactured according to the proposed method, passed 100% of the bending tests for a bending radius of 7 mm, regardless of whether the top side or the root side was in tension. The samples from the product batch S3 had a pass rate of only 30% for a bending radius of 9 mm when the root side was in tension, and the samples from the product batch S4 had a pass rate of less than 40% at a bending radius of 8 mm. Thus, the samples from the product batch S2 produced according to the invention perform significantly better than samples from the reference product batches S3 and S4.

Microscopy investigations of samples from the different product batches show that the microstructure of samples from the product batch S2 produced according to the invention is martensitic, also across the area of the weld. For samples from the product batch S4, the microstructure within the area of the weld is martensitic with a significant presence of grain boundary ferrite.

It is to be understood that the present invention is not limited to the embodiments described above and illustrated in the drawings; rather, the skilled person will recognize that many changes and modifications may be made within the scope of the appended claims.

The invention claimed is:

1. A method for manufacturing a steel sheet product, comprising:
   providing at least one steel slab,
   strip rolling of the at least one steel slab to form at least one steel strip, forming at least two steel sheets extending in a longitudinal direction (A) from the at least one steel strip,
   cleaning longitudinal edges of the at least two steel sheets by removing any surface oxide layers therefrom, wherein the surface oxide layers are iron oxides resulting from the strip rolling,
   joining the at least two steel sheets along the cleaned longitudinal edges using butt welding without filler material to form a weld, wherein inert gas protection is applied on both a top side and a root side of the weld during welding, thereby obtaining a welded steel sheet product,
   removing excess material from the weld, and
   hardening of the welded steel sheet product by means of heat treatment and subsequent quenching, thereby producing the steel sheet product.

2. The method according to claim 1, wherein each steel sheet of the at least two steel sheets has a microstructure comprising at least 80% martensite in terms of area percentages and a tensile strength of at least 950 MPa.

3. The method according to claim 1, wherein each steel sheet of the at least two steel sheets is a non-coated steel sheet.

4. The method according to claim 1, wherein the at least two steel sheets have an identical chemical composition.

5. The method according to claim 1, wherein each steel sheet of the at least two steel sheets has a chemical composition comprising, in percent by weight (wt. %):
C: 0.050-0.32,
Si: 0.10-0.70,
Mn: 0.40-1.6,
P: 0-0.025,
S: 0-0.010,
Cr: 0-1.5,
Ni: 0-2.5, Mo: 0-0.70,
Ti: 0-0.060,
Al: 0-0.15,
V: 0-0.070,
Nb: 0-0.20,
B: 0.00020-0.0050, and balance Fe and impurities.

6. The method according to claim 1, wherein the butt welding is carried out using a laser welding process.

7. The method according to claim 1, wherein the quenching is water quenching or oil quenching.

8. The method according to claim 1, wherein the step of removing any surface oxide layers is carried out using at least one of pickling, grinding, and laser ablation.

9. The method according to claim 1, wherein the at least two steel sheets have an identical thickness (t) of 1-6 mm.

10. The method according to claim 1, wherein each one of the at least two steel sheets has a width as measured in a transverse direction (B) of at least 1000 mm.

\* \* \* \* \*